(12) United States Patent
Schur et al.

(10) Patent No.: US 7,496,165 B2
(45) Date of Patent: Feb. 24, 2009

(54) METHOD AND DEVICE FOR MOTION-COMPENSATED NOISE EVALUATION IN MOBILE WIRELESS TRANSMISSION SYSTEMS

(75) Inventors: Romed Schur, Freiburg (DE); Arnoud Hendrik Van Klinken, Wolfheze (NL)

(73) Assignee: Micronas GmbH, Freiburg (DE)

( * ) Notice: Subject to any disclaimer, the term of this patent is extended or adjusted under 35 U.S.C. 154(b) by 469 days.

(21) Appl. No.: 11/137,129

(22) Filed: May 25, 2005

(65) Prior Publication Data

US 2005/0271171 A1 Dec. 8, 2005

(30) Foreign Application Priority Data

May 25, 2004 (DE) ...................... 10 2004 026 072

(51) Int. Cl.
*H03D 1/04* (2006.01)

(52) U.S. Cl. .............. 375/346; 375/240.01; 375/240.12

(58) Field of Classification Search ............ 375/240.13, 375/240.12, 240.17, 260, 267; 348/620; 455/442
See application file for complete search history.

(56) References Cited

U.S. PATENT DOCUMENTS

| | | | | |
|---|---|---|---|---|
| 4,437,119 A | * | 3/1984 | Matsumoto et al. | 375/240.13 |
| 4,679,086 A | * | 7/1987 | May | 348/620 |
| 5,719,630 A | * | 2/1998 | Senda | 375/240.17 |
| 6,184,792 B1 | * | 2/2001 | Privalov et al. | 340/578 |
| 6,208,690 B1 | * | 3/2001 | Tomizawa | 375/240.12 |
| 6,636,574 B2 | | 10/2003 | Mallette et al. | 375/360 |
| 2002/0186761 A1 | | 12/2002 | Corbaton et al. | |
| 2004/0081230 A1 | | 4/2004 | Abrishamkar et al. | 375/148 |
| 2004/0203790 A1 | * | 10/2004 | Ali et al. | 455/442 |

FOREIGN PATENT DOCUMENTS

WO    WO 00/72044    11/2000    ...................... 11/2

OTHER PUBLICATIONS

EP Search Report.

\* cited by examiner

*Primary Examiner*—Sudhanshu C Pathak
(74) *Attorney, Agent, or Firm*—O'Shea Getz P.C.

(57) ABSTRACT

A device for motion-compensated noise evaluation for mobile wireless transmission systems, in which reference symbols are sent out by a transmitter, includes storage devices for reference symbols sent out in direct or indirect temporal succession and furnished to a receiver. The device computes a static component of the received reference symbols by forming a statistical moment from at least some of the reference symbols saved in the storage devices. A dynamic component of the received reference symbols is determined from the difference of at least two reference symbols saved in the storage devices, and a prediction device determines a predicted value for the next reference symbol supplied by the receiver by using the static component and the dynamic component of the reference symbols. A prediction error is determined from the difference between the predicted reference symbol and the next reference symbol supplied by the receiver, and an estimate for the noise is computed. The prediction device is adapted through the prediction error to time changes in the transmission channel.

18 Claims, 5 Drawing Sheets

METHOD AND DEVICE FOR MOTION-COMPENSATED NOISE EVALUATION IN MOBILE WIRELESS TRANSMISSION SYSTEMS

PRIORITY INFORMATION

This application claims priority from German patent application DE 10 2004 026 072.9 filed May 25, 2004.

BACKGROUND OF THE INVENTION

The invention relates to motion-compensated noise evaluation in mobile wireless transmission systems, in which reference symbols are sent out by a transmitter.

Figure 1:
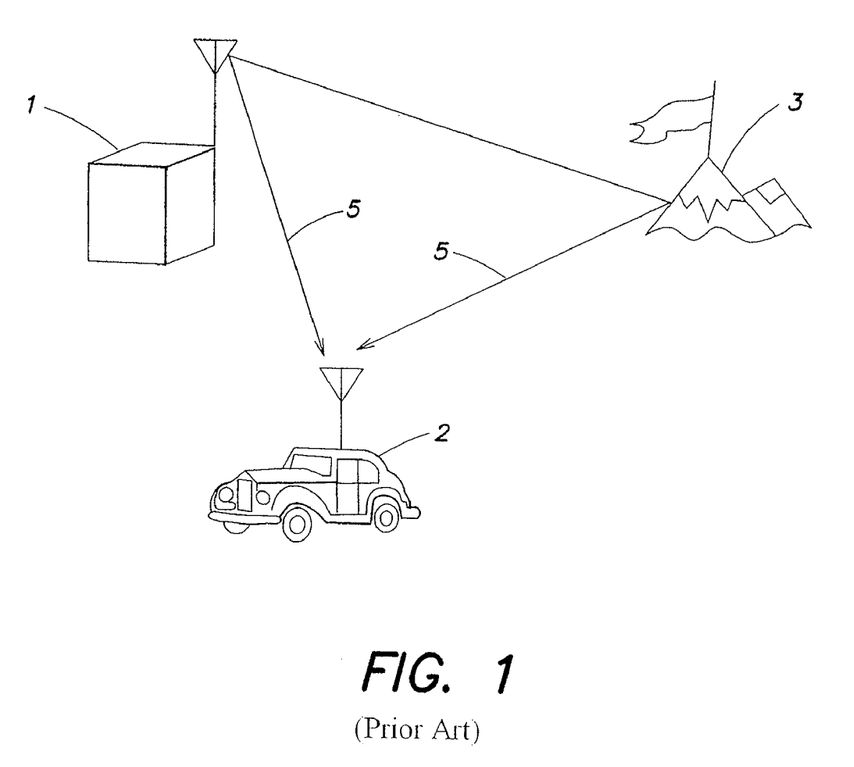
FIG. 1 is a pictorial illustration of a mobile wireless transmission system.

Wireless transmission systems, as illustrated in FIG. 1, generally have at least one transmitter 1 as well as a receiver 2. In mobile transmission systems, the transmitter 1 or the receiver 2 is mobile, which is expressed in the figure by the mobile receiver 2. A data signal is sent out by the transmitter 1, which goes via a transmission channel, also known as a radio channel, to the receiver 2. The transmission properties of this transmission channel are dictated by the particular prevailing transmission situation. For example, the transmission situation is critically influenced by the distance between the transmitter 1 and the receiver 2, by reflections of data or radio signals from buildings, mountains, vehicles, or other obstacles 3, and also by the frequency shift caused by the Doppler effect when the relative speed between the transmitter 1 and receiver 2 is not insignificant.

Due to the influence of the transmission properties of the transmission channel, the data signal is distorted, so that the signal received in the receiver 2 generally does not match the data signal that was sent. It is therefore necessary to reconstruct the data signal in the receiver, which requires matching of the receiver to the transmission channel or its transmission properties in order to achieve the best possible reconstruction.

One of the major transmission properties of the transmission channel is its transfer function. The frequency spectrum of the signal received in the receiver is computed from the frequency spectrum of the data signal sent multiplied by this transfer function. Accordingly, the transfer function represents an interconnection between the data signal sent and the received signal. Thus, for example, evaluation of the transfer function is a central problem in coherent demodulation of Orthogonal Frequency Division Multiplexing (OFDM) signals.

The reconstruction of the data signal at the receiver end is typically impaired by noise and interference components, which are superimposed on the signal received in the receiver. The noise is caused primarily by thermal motions of elementary particles. The causes of interference are of a more diverse nature and can be produced, for example, by the simultaneous receiving of a foreign transmitter. The following will deal only with noise, understood as including the above-mentioned interference.

Moreover, a relative movement between the transmitter and the receiver also produces temporal variance or time variance, which is a change in the transmission channel or the transmission properties over time. This also impairs the reconstruction of the data signal at the receiving end.

Ensuring the highest possible quality of the data signal reconstructed at the receiving end therefore requires analysis of the received data signal in regard to the perturbing effects of noise and time variance of the transmission channel and a corresponding adapting of the receiver to the particular prevailing transmission properties.

For this reason, techniques are employed to evaluate the relative speed between a transmitter and a receiver, such as are known from German Patent DE 129 23 690 A1 or U.S. Pat. No. 6,636,574. Techniques are also known for estimating the noise level in transmission systems, whereby reference symbols are introduced into the data signal. Here, the noise level contained in the received data signal is estimated by the deviation of the received reference symbol from the reference symbol originally sent.

However, the noise components estimated in this way in the received data signal also contain interference components caused by the temporal change in the transmission channel or its transmission properties. When reconstructing the data signal originally sent using the results of the noise evaluation, these components of the time variance of the transmission channel lead to a distortion of the actual result. Furthermore, the noise components contained in the received data signal hinder a precise determination of the time variance of the transmission channel. In addition, a relative speed between the transmitter and the receiver is estimated, the result of this estimation is subject to errors by virtue of the noise.

Therefore, there is a need for a motion-compensated noise evaluation for mobile wireless transmission systems, in which reference symbols are sent out by a transmitter.

SUMMARY OF THE INVENTION

From at least some of the reference symbols received directly or indirectly in temporal succession in a receiver, a static component of the received reference symbol is determined by forming a statistical moment, which is for example an arithmetic mean. At least two reference symbols following each other either directly or indirectly in time are compared to determine a dynamic component of the received reference symbols. The static and the dynamic component of the reference symbols are then processed to determine a prediction value for the next reference symbol received. After reception of this next reference symbol a prediction error is determined by comparing the received reference symbol with the prediction value, and ascertaining from the prediction error an estimate for the noise of a data signal transmitted in a transmission channel. The calculation of the prediction value is adapted to temporal changes in the transmission channel, taking into account the prediction error.

This produces a motion-compensated noise estimate in which the outcome of the estimate is not affected by a time variance of the transmission channel due to the relative motion between the transmitter and the receiver. Consequently, a more precise reconstruction of the original data signal can be achieved, so that the quality of the data signal reconstructed at the receiving end is improved.

These and other objects, features and advantages of the present invention will become more apparent in light of the following detailed description of preferred embodiments thereof, as illustrated in the accompanying drawings.

DETAILED DESCRIPTION OF THE INVENTION

FIG. 1 is pictorial illustration of a mobile wireless transmission system. A data signal transmitted by the transmitter 1 goes via various pathways forming the transmission channel 5 to the receiver 2, often being partially reflected by obstacles 3.

Figure 2A:
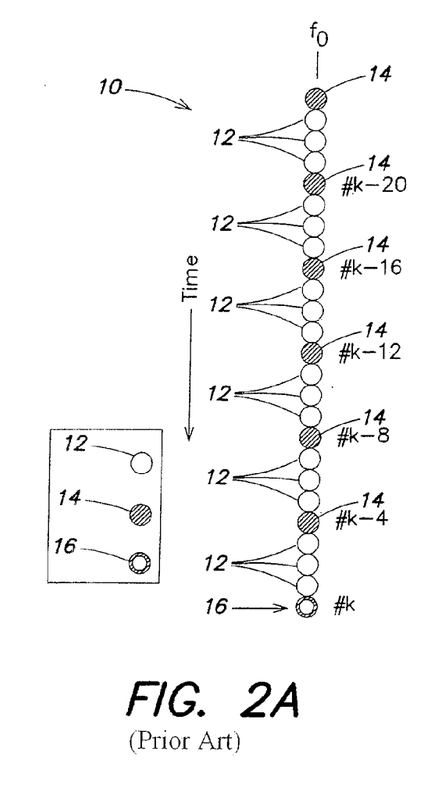
FIGS. 2A and 2B show examples of data signals with introduced reference symbols, where in (a) the data signal has a carrier frequency, and in (b) an OFDM data signal is depicted.

FIG. 2A illustrates a data signal 10 with a single carrier frequency $f_0$, in which reference symbols 14, 16 have been introduced at equal-time intervals between information symbols 12. As indicated by the serial index k, reference symbols 14, 16 occur each time after three information symbols 12. The new reference symbol 16 currently received bears the serial index k, so that reference symbols with an index value less than k have already been received in a receiver and have possibly been saved there.

Figure 2B:
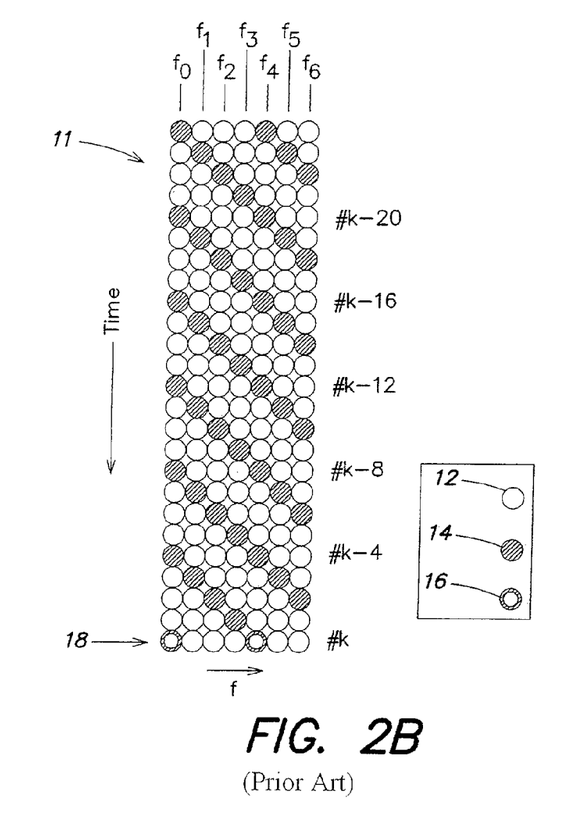

FIG. 2B illustrates an OFDM data signal 11 with multicarrier transmission. Here, a plurality of carrier frequencies $f_0$, $f_1$, $f_2$, $f_3$, $f_4$, $f_5$, $f_6$ are used with a fixed frequency interval, each of them carrying data signals. On each of these carrier frequencies $f_0$, $f_1$, $f_2$, $f_3$, $f_4$, $f_5$, $f_6$ extending along the frequency axis f, reference symbols 14, 16 are transmitted between information symbols 12. The reference symbols 16 currently received form, together with the information symbols likewise received at this moment in time and designated with the serial index k, a new currently received OFDM symbol 18. Such OFDM data signals are used, for example, in digital audio broadcasting (DAB) systems or digital television transmission systems, such as digital video broadcasting terrestrial (DVB-T).

Figure 3A:
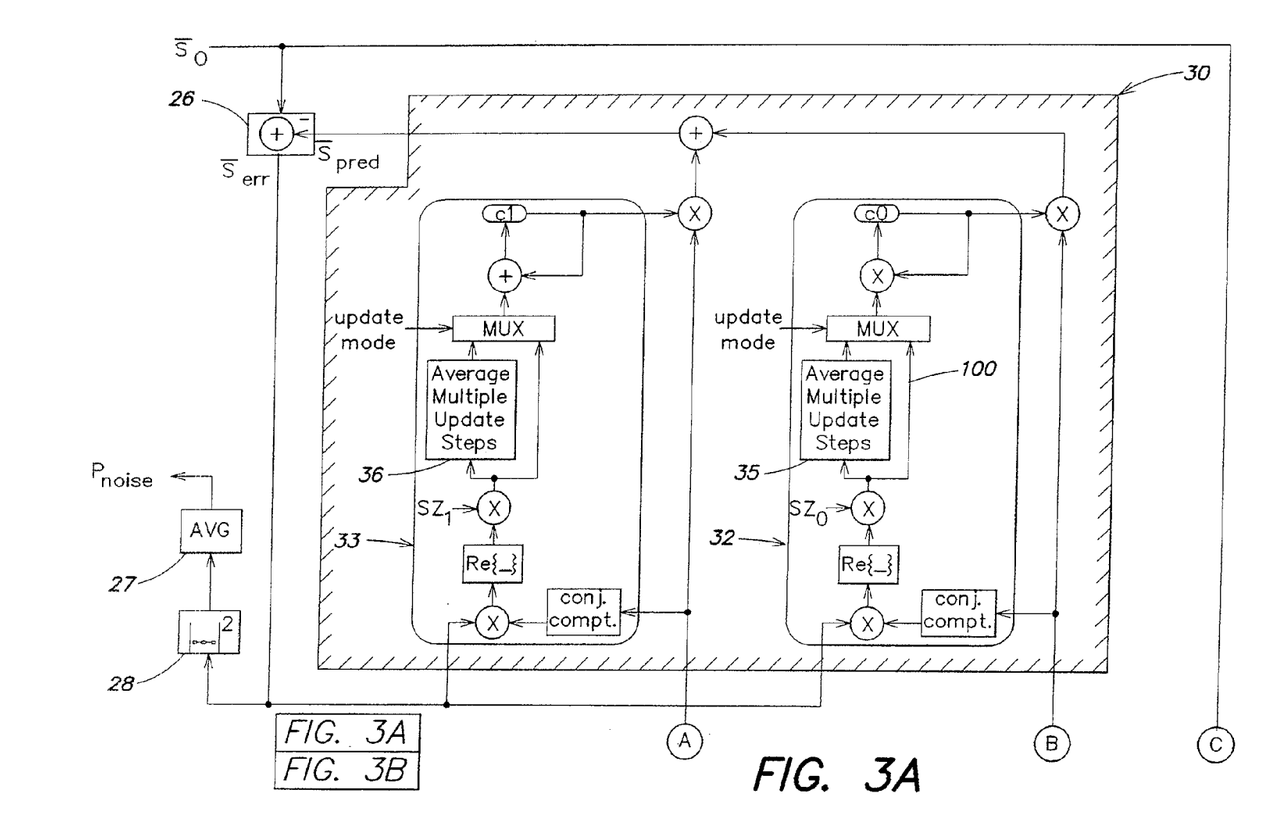
FIG. 3 is a block diagram illustration of a motion-compensated noise evaluation system.
Figure 3B:
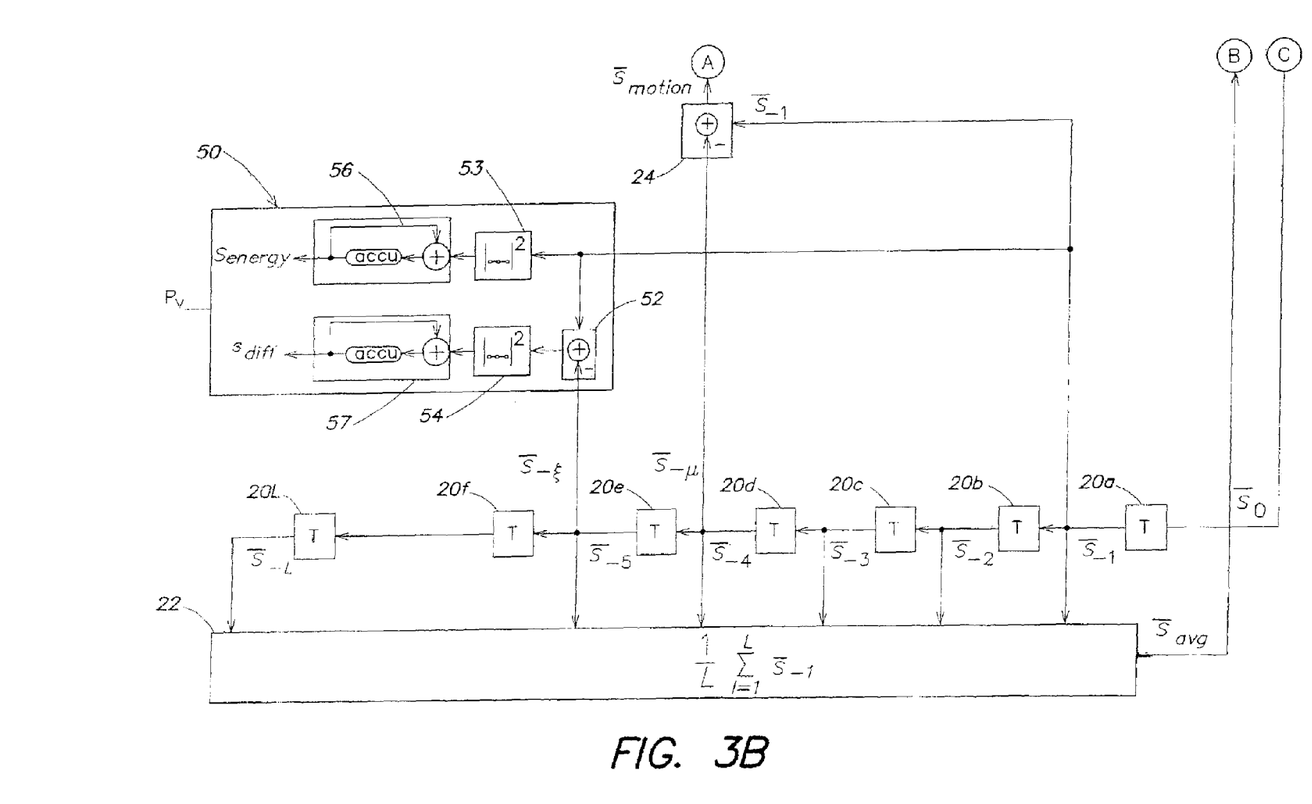

FIG. 3 is a schematic representation of a device for motion-compensated noise evaluation in mobile wireless transmission systems, in which the reference symbols 14, 16 are sent out by the transmitter 1, similar to what is illustrated in FIG. 2A. However, the present invention can also be applied to multicarrier frequency signals, such as the OFDM signal of FIG. 2B, by applying the technique to each carrier frequency, or also to just one carrier frequency and borrowing the result of the noise estimation for the other carrier frequencies, possibly allowing for the different values of the carrier frequencies.

At the start of a process cycle, from at least some of the reference symbols $\bar{s}_{-1}, \bar{s}_{-2}, \ldots, \bar{s}_{-L}$ received in direct or indirect succession in time in a receiver 2, one forms a statistical moment in order to determine a static component $\bar{s}_{avg}$ of the received reference symbols $\bar{s}_{-1}, \bar{s}_{-2}, \ldots, \bar{s}_{-L}$. The bar in the notation indicates that we are dealing with complex quantities.

In the present embodiment, the statistical moment determined is the arithmetic mean of the reference symbols $\bar{s}_{-1}$, $\bar{s}_{-2}, \ldots \bar{s}_{-L}$ received most recently in temporal succession with an interval T. Then, a dynamic component $\bar{s}_{motion}$ of the received reference symbols $\bar{s}_{-1}, \bar{s}_{-2}, \ldots, \bar{s}_{-L}$ is determined by comparing the reference symbols $\bar{s}_{-\mu}$ and $\bar{s}_{-1}$, which follow in temporal succession, where $L \geq \mu > 1$, $\mu$ is a whole number, and $\bar{s}_{-\mu}$ in FIG. 3 is chosen as $\bar{s}_{-4}$. The comparison is done preferably by subtraction or forming the difference. Moreover, a larger number of reference symbols coming in direct or indirect succession in time can also be used to determine the dynamic component of $\bar{s}_{motion}$.

A prediction value $\bar{s}_{pred}$ is formed for the next received reference symbol $\bar{s}_0$ from the static $\bar{s}_{avg}$ and the dynamic component $\bar{s}_{motion}$ of the reference symbols $\bar{s}_{-1}, \bar{s}_{-2}, \ldots, \bar{s}_{-L}$. This prediction value $\bar{s}_{pred}$ is preferably formed from a linear combination of the static $\bar{s}_{avg}$ and the dynamic component $\bar{s}_{motion}$ of the reference symbols $\bar{s}_{-1}, \bar{s}_{-2}, \ldots, \bar{s}_{-L}$, for example as follows:

$$\bar{s}_{pred} = c0 \cdot \bar{s}_{avg} + c1 \cdot \bar{s}_{motion}$$

The prediction value $\bar{s}_{pred}$ is compared with the next actually received reference symbol $\bar{s}_0$, which is preferably done by subtracting the prediction value $\bar{s}_{pred}$ from the received reference symbol $\bar{s}_0$. The result is a prediction error $\bar{s}_{err}$, being the difference between prediction value $\bar{s}_{pred}$ and received reference symbol $\bar{s}_0$.

Using the prediction error $\bar{s}_{err}$, an estimate for the noise $P_{noise}$ of a data signal 10 transmitted in a transmission channel 5 is determined. This is preferably done, as shown in FIG. 3, by forming the square of the absolute value of $\bar{s}_{err}$ and taking the mean of the result with the squares of the absolute values of prediction errors that were determined in previous process cycles.

In this way, one obtains in steady state a motion-compensated estimate for the noise $P_{noise}$.

Since the transmission channel may have a time variance, it is not possible to form the prediction value $\bar{s}_{pred}$ always in the same way from the static component $\bar{s}_{avg}$ and the dynamic component $\bar{s}_{motion}$. Thus, the manner of forming the prediction value $\bar{s}_{pred}$ is adapted to temporal changes in the transmission channel 5, allowing for the prediction error $\bar{s}_{err}$. In the present embodiment, where the prediction value $\bar{s}_{pred}$ is formed by forming the aforesaid linear combinations, this adapting is done by adapting the parameters c0 and c1. One can use a plurality of familiar adaptation algorithms for this. In this embodiment, adapting the calculation of the prediction value $\bar{s}_{pred}$ to temporal changes in the transmission channel 5 is preferably done using the least squares method.

Adapting of the calculation of the prediction value $\bar{s}_{pred}$ can be adjusted each time after determining another prediction error $\bar{s}_{err}$. Alternatively, the adapting can be done after certain time intervals, each time taking into account at least one part of the prediction error $\bar{s}_{err}$ determined in the particular time interval for the adjustment. In this case, the adjustment of the formation of the prediction $\bar{s}_{pred}$ is done by taking the mean of the adjustments resulting each time from factoring in the individual prediction errors $\bar{s}_{err}$. In this way, one avoids a heightened sensitivity of the method to transient perturbations of the data signal or the transmission channel.

In the embodiment illustrated in FIG. 3, a known time interval T in the receiver is used for the identification of the reference symbols $\bar{s}_{-1}, \bar{s}_{-2}, \ldots, \bar{s}_{-L}, \bar{s}_0$, in which the reference symbols $\bar{s}_{-1}, \bar{s}_{-2}, \ldots, \bar{s}_{-L}, \bar{s}_0$ are sent out. As an alternative or in addition to this, one can also use a known form of the reference symbols $\bar{s}_{-1}, \bar{s}_{-2}, \ldots, \bar{s}_{-L}, \bar{s}_0$ in the receiver 2 for their identification.

In one modification, the value of at least one parameter is used to calculate the prediction value $\bar{s}_{pred}$ as an indicator of the time variance of the transmission channel 5. In the present embodiment, in which the prediction value $\bar{s}_{pred}$ is formed according to the above indicated linear combination with the parameters c0 and c1, the parameter c1 plays this indicator role. While c0 in the steady state has values of roughly 1, c1 is approximately 0 for a time-invariant transmission channel and is determined by the following relation for a time-variant transmission channel:

$$cl \approx \frac{\frac{L-1}{2}+1}{\mu-1} > \frac{1}{2}$$

A value of c1>½ can thus be seen as an indication of a time-variant transmission channel and, thus, a relative velocity between the transmitter 1 and the receiver 2 not equal to zero.

The values of the parameters c0 and c1 in the case of a static and a time-variant transmission channel are again summarized in the following table.

| | | |
|---|---|---|
| Static transmission channel | $c0 \approx 1$ | $c1 \approx 0$ |
| Time-variant transmission channel | $c0 \approx 1$ | $cl \approx \frac{\frac{L-1}{2}+1}{\mu-1} > \frac{1}{2}$ |

Figure 4A:
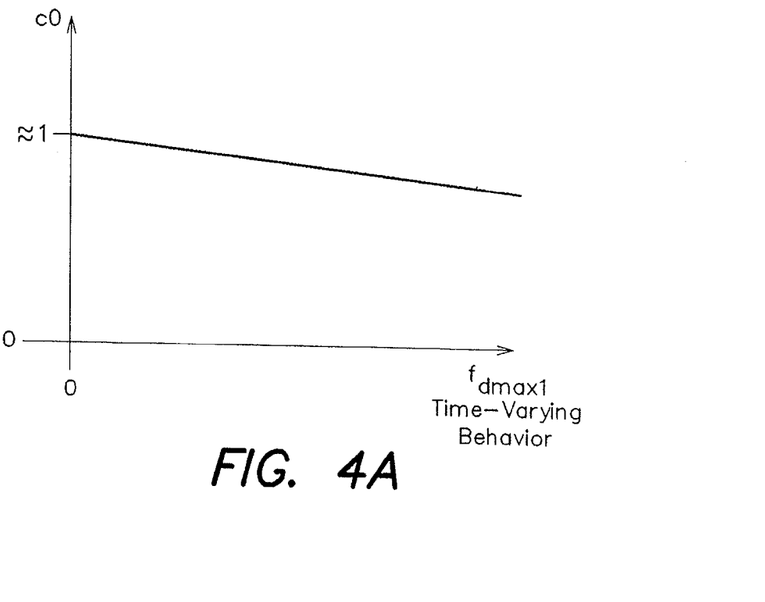
FIGS. 4A and 4B graphically illustrate the dependence of the parameters c1 and c0, respectively, on the time variance.
Figure 4B:
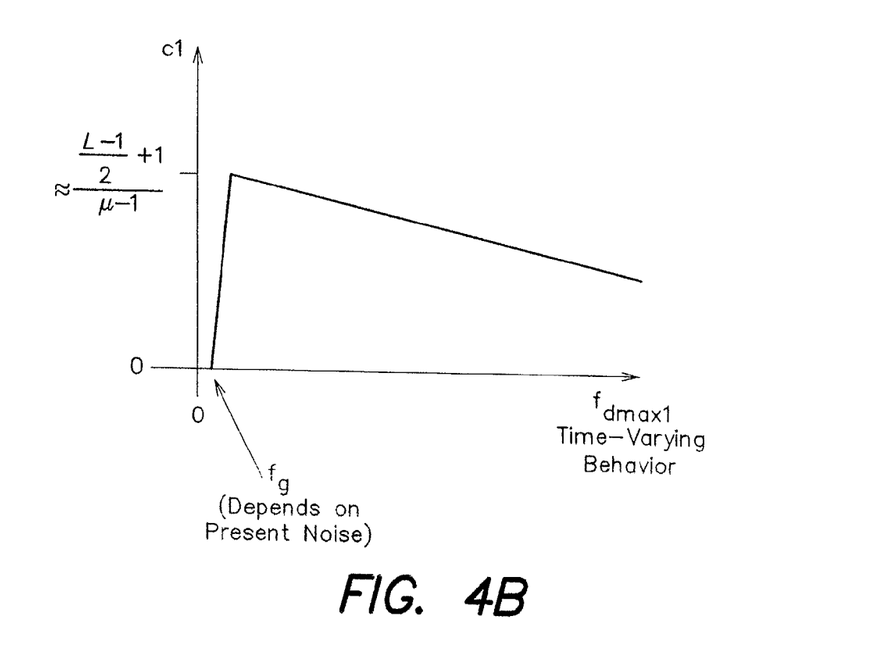

FIGS. 4A and 4B graphically illustrate the dependence of the parameters c1 and c0, respectively, on the time variance. While c0 is approximately 1 for time invariance and drops off slightly with increasing time variance of the transmission channel, c1 has a value of 0 for time-invariant transmission channel, rises very quickly with increasing time variance, starting from a limit range $f_g$, which depends on the noise present, and reaches a maximum value, from which c1 again slowly drops off with increasing time variance.

In addition to motion-compensated noise evaluation, an evaluation of the relative velocity between the transmitter 1 and receiver 2 may also be performed. For this, one first forms the sum of the square of absolute value for the difference of K equally time-spaced reference symbols $\bar{s}_{-1}$ and $\bar{s}_{-\xi}$ is formed, with K ideally taking on values larger than 100. After normalizing the result, a measure Q of the time variance in the transmission channel 5 is provided, corresponding to a relative velocity between the receiver 2 and the transmitter 1. In this way, an estimate $P_v$ for this relative velocity is obtained. In the present embodiment, the measure Q is determined, for example, by the following relation:

$$Q = \frac{\sum_{h=1}^{K}|\bar{s}_{-1h} - \bar{s}_{-\xi h}|^2}{\sum_{h=1}^{K}|\bar{s}_{-1h}|^2} = \frac{S_{diff}}{S_{energy}}$$

The sum over K squares of absolute value of the reference symbol $\bar{s}$-1, used for the normalization, represents a measure for the energy and is therefore called the energy measure $S_{energy}$, for short. The numerator $S_{diff}$, on the other hand, provides a measure of the velocity. As already mentioned, instead of the normalization by the energy measure $S_{energy}$, one can also perform a different normalization, for example by using $\bar{s}_{avg}$ instead of $\bar{s}_{-1}$ in the denominator.

In FIG. 3, $\xi$ has the arbitrary value of 5. In theory, other values can also be used, although one must make sure that $L \geq \xi > 1$.

A theoretical limit exists for the scaling of the velocity by the quotient Q, being determined basically by the value of $\xi$. $\xi$ is characterized by the maximum Doppler frequency $f_{dmax2}$ that can be achieved in the received data signal. For this, we have:

$$f_{dmax2} \leq \frac{1}{2(\xi - 1)T}$$

A theoretical limit also exists for determining the time variance of the transmission channel by a parameter c1 functioning as an indicator, being substantially influenced by the value of μ and characterized by another maximum Doppler frequency $f_{dmax1}$ that can be achieved in the received data signal. For this, we have:

$$f_{dmax1} \leq \frac{1}{2(\mu - 1)T}$$

In both relations, T designates the time interval between reference symbols directly following each other.

If the existence of a time-variant transmission channel and a velocity evaluation are being performed, the maximum Doppler frequency obtained in the received data signal should be smaller than the smaller of the two values $f_{dmax1}$ and $f_{dmax2}$.

A preferred embodiment calls for determining the measure Q of the relative velocity between the transmitter 1 and receiver 2 only if a time variance of the transmission channel is established by at least one of the parameters used in forming the prediction $\bar{s}_{pred}$, in the present exemplary embodiment, by the parameter c1. In this way, one can avoid unnecessary relative velocity estimates.

The motion-compensated estimate for the noise $P_{noise}$ is used to perform a correction of the noise-impaired estimate $P_v$ for the relative velocity between the receiver 2 and the transmitter 1.

FIG. 3 is a block diagram illustration of a device for motion-compensated noise evaluation. The device includes a plurality of storage devices 20a, 20b, . . . , 20L for reference symbols $\bar{s}_{-1}, \bar{s}_{-2}, \ldots, \bar{s}_{-L}$ sent out by the transmitter 1 in direct or indirect temporal succession, which can be supplied from a receiver 2. These storage devices are preferably configured as First-In-First-Out (FIFO) storages, so that the last L reference symbols are always on hand in the storage devices.

A device 22 is provided to compute a static component $\bar{s}_{avg}$ of the received reference symbols $\bar{s}_{-1}, \bar{s}_{-2}, \ldots, \bar{s}_{-L}$, by forming a statistical moment from at least some of the reference symbols $\bar{s}_{-1}, \bar{s}_{-2}, \ldots, \bar{s}_{-L}$, saved in the storage devices 20a, 20b, . . . , 20L. In this, using the configuration variant of FIG. 3, the statistical moment is computed by forming the arithmetic mean of the reference symbols $\bar{s}_{-1}, \bar{s}_{-2}, \ldots, \bar{s}_{-L}$ saved in the storage devices 20a, 20b, . . . , 20L. A subtracter 24 is provided to determine a dynamic component $\bar{s}_{motion}$ of the received reference symbols $\bar{s}_{-1}, \bar{s}_{-2}, \ldots, \bar{s}_{-L}$ from the difference of at least two reference symbols $\bar{s}_{-1}, \bar{s}_{-\mu}$ saved in the storage devices 20a, 20b, . . . , 20L. This can receive the reference symbol $\bar{s}_{-1}$ saved in the storage device 20a, as well as the reference symbol $\bar{s}_{-\mu}$, while in the embodiment illustrated in FIG. 3 the value of 4 has been selected for μ, so that the reference symbol $\bar{s}_{-4}$ saved in the storage device 20d can be furnished to the subtracter 24 as $\bar{s}_{-\mu}$.

A prediction device 30 determines a prediction value $\bar{s}_{pred}$ for the next reference symbol $\bar{s}_0$ furnished by the receiver, making use of the static component $\bar{s}_{avg}$ and the dynamic component $\bar{s}_{motion}$ of the reference symbols $\bar{s}_{-1}, \bar{s}_{-2}, \ldots \bar{s}_{-L}$.

The prediction value $\bar{s}_{pred}$ and the next reference symbol $\bar{s}_0$ are input to a subtracter 26, which provides a prediction error $\bar{s}_{err}$.

The prediction error is input to a unit for forming the squares of absolute values 28 and the squared value is input to an averaging unit 27, that provides a predicted value $P_{noise}$ for the noise of a data signal transmitted in a transmission channel 5 from the prediction error $\bar{s}_{err}$.

The prediction device 30 may be adapted by the prediction error $\bar{s}_{err}$ to time changes in the transmission channel 5. In the present embodiment, the prediction value $\bar{s}_{pred}$ is determined by forming a linear combination from the static component $\bar{s}_{avg}$ and the dynamic component $\bar{s}_{motion}$ by using the parameters c0 and c1. A first unit 32 for adapting parameter c0 and a second unit 33 for adapting parameter c1 are arranged to adapt the prediction device 30. If the prediction value $\bar{s}_{pred}$ is formed otherwise, other mechanisms may be provided to adapt the prediction device 30.

The first unit 31 receives static component $\bar{s}_{avg}$ and multiplies the complex conjugate of the component by the prediction error. The real part of the resultant product is then multiplied by a scaling factor for incremental regulation $sz_0$ to provide a signal on a line 100. The signal on the line 100 is input to a multiplexer, which selects between the signal on the line 100 and an averaged signal provided by an averaging unit for adaptation steps 35. The unit 33 for adapting c1 is constructed similarly, but rather than multiplying the real part with the scaling factor $sz_0$ the real part is multiplied with the scaling factor for incremental regulation $sz_1$, and instead of c0 it is c1 which can be subjected to the resulting adaptation steps or adapted on the basis of the adaptation value determined by the unit for averaging of c1 adaptation steps.

The above-mentioned units for averaging of adaptation steps 35 and 36 represent a modification of the device, since they can be used to avoid excessive sensitivity of the device for motion-compensated noise evaluation to transient perturbations.

The reference symbols saved in the storage devices 20a, 20b, . . . , 20L may also be used to estimate a relative velocity $P_v$ between the transmitter 1 and receiver 2. A relative velocity estimating unit 50 receives the reference symbol $\bar{s}_{-1}$ and the reference symbol $\bar{s}_{-\xi}$, while $\xi$ here is chosen as 5, from the corresponding storage devices 20a and 20e. The difference determined by the subtracter 52 can be taken to the unit for forming squares of absolute values 54, and furthermore the reference symbol $\bar{s}_{-1}$ can be taken to the unit for forming of squares of absolute values 53. The output signals from the units for forming of squares of absolute values 53 and 54 can each be taken to adders 56 and 57, in which an energy measure $s_{energy}$ and a velocity measure $s_{diff}$ can be determined, respectively. From the energy measure $s_{energy}$ and the velocity measure $s_{diff}$ one can determine a measure Q of the relative velocity, from which one can determine an estimate $P_v$ for the relative velocity between the transmitter 1 and receiver 2.

In one embodiment, one selects $\xi=\mu$ and the output signal of the subtracter 24 $\bar{s}_{motion}$ can be taken not only to the prediction device 30, but also to the relative velocity estimating unit 50 and the unit for forming the squares of absolute values 54, so that the subtracter 52 can be dispensed with. This leads to a less expensive device, which can be used not only for the motion-compensated noise evaluation, but also an estimation of the relative velocity between the transmitter and the receiver.

In a preferred embodiment, the various units, devices, subtracters and adders, as well as storage devices, or all or some of them, are integrated in one or more microprocessor units.

Furthermore, one configuration variant of the invention makes it possible to deposit in the device according to the invention the time interval T in which reference symbols 14, 16 are sent and/or the shape of the reference symbols.

Although the present invention has been illustrated and described with respect to several preferred embodiments thereof, various changes, omissions and additions to the form and detail thereof, may be made therein, without departing from the spirit and scope of the invention.

What is claimed is:

1. A method for motion-compensated noise evaluation for mobile wireless transmission systems, in which reference symbols are sent out by a transmitter (1), comprising:
   determining a static component of the received reference symbols by forming a statistical moment from at least some of the reference symbols following each other directly or indirectly in time and received in a receiver;
   determining a dynamic component of the received reference symbols by comparing at least two directly or indirectly time-consecutive reference symbols;
   computing a prediction value for the next reference symbol received from the static and the dynamic component of the received reference symbols;
   after receiving the next reference symbol, this received reference symbol is compared to the prediction value to determine a prediction error;
   determining from the prediction error an estimate for noise of a data signal transmitted in a transmission channel;
   and by taking account of the prediction error, the calculation of the prediction is adapted to time changes in the transmission channel.

2. The method of claim 1, wherein the evaluation of the reference symbols makes use of a known time interval in the receiver, during which the reference symbols are sent out, and/or a known shape of the reference symbols in the receiver.

3. The method of claim 1, wherein the reference symbols are sent out at equal time intervals.

4. The method of claim 1, wherein the calculation of the predicted value makes use of a linear combination of the static and the dynamic component of the reference symbols.

5. The method of claim 1, wherein the calculation of the predicted value is adapted to time changes in the transmission channel by using the least squares method.

6. The method of claim 1, wherein the calculation of the predicted value is adapted each time after determining an additional prediction error.

7. The method of claim 1, wherein the adapting of the calculation of the predicted value always takes place after certain time intervals, taking into account at least some of the prediction errors determined in the particular time interval.

8. The method of claim 7, wherein the adapting of the calculation of the predicted value is done by the averaging of adaptations resulting each time from consideration of the individual prediction errors.

9. The method of claim 8, wherein the value of at least one parameter used in calculating the predicted value is used as an indicator for the time variance of the transmission channel.

10. The method of claim 9, wherein summation of the squares of absolute values of the differences of K reference symbols with equal spacing in time and normalization of the latter are done to determine a measure Q of the time variance of the transmission channel, coordinated with an estimate for the relative velocity of the receiver to the transmitter.

11. The method of claim 9, wherein the measure Q is determined when a time variance of the transmission channel is established by at least one parameter used in computing the predicted value.

12. A device for motion-compensated noise evaluation for mobile wireless transmission systems, in which reference symbols are sent out by a transmitter, comprising:

- storage devices for reference symbols sent out in direct or indirect temporal succession and furnished to a receiver;
- means for computing a static component of the received reference symbols by forming a statistical moment from at least some of the reference symbols saved in the storage devices;
- means of determining a dynamic component of the received reference symbols from the difference of at least two reference symbols saved in the storage devices;
- a prediction device for determining a predicted value for the next reference symbol supplied by the receiver by using the static component and the dynamic component of the reference symbols;
- means for determining a prediction error from the difference between the predicted reference symbol and the next reference symbol supplied by the receiver;
- means for computing an estimate for the noise of a data signal transmitted in a transmission channel from the prediction error; and
- means for adapting the prediction device through the prediction error to time changes in the transmission channel.

13. The device of claim 12, wherein the time interval during which the reference symbols are sent and/or the shape of the reference symbols can be stored in the device or in the receiver.

14. The device of claim 12, wherein the prediction device for predicting the next reference symbol supplied by the receiver forms a linear combination from the static and the dynamic component of the reference symbols.

15. The device of claim 12, wherein units are provided for determination of adaptation steps.

16. The device of claim 12, wherein the storage devices for reference symbols are designed as First-In-First-Out memories.

17. The device of claim 12, comprising means for estimating the relative velocity between the transmitter and receiver by reference symbols saved in the storage devices for reference symbols.

18. The device of claim 17, wherein the means for estimating the relative velocity between the transmitter and receiver includes at least two adders.

* * * * *